United States Patent
Kim et al.

(10) Patent No.: US 10,152,252 B2
(45) Date of Patent: Dec. 11, 2018

(54) MEMORY SYSTEM AND OPERATING METHOD THEREOF

(71) Applicant: SK hynix Inc., Gyeonggi-do (KR)

(72) Inventors: Do-Hyun Kim, Gyeonggi-do (KR);
Soong-Sun Shin, Gyeonggi-do (KR);
Dae-Hong Kim, Gyeonggi-do (KR)

(73) Assignee: SK Hynic Inc., Gyeonggi-do (KR)

( * ) Notice: Subject to any disclaimer, the term of this patent is extended or adjusted under 35 U.S.C. 154(b) by 38 days.

(21) Appl. No.: 15/408,873

(22) Filed: Jan. 18, 2017

(65) Prior Publication Data

US 2017/0315743 A1 Nov. 2, 2017

(30) Foreign Application Priority Data

Apr. 27, 2016 (KR) .................. 10-2016-0051451

(51) Int. Cl.
*G06F 3/06* (2006.01)

(52) U.S. Cl.
CPC ............ *G06F 3/0619* (2013.01); *G06F 3/065* (2013.01); *G06F 3/068* (2013.01)

(58) Field of Classification Search
CPC ....... G06F 3/0647; G06F 3/068; G06F 3/0619
See application file for complete search history.

(56) References Cited

U.S. PATENT DOCUMENTS

| | | | |
|---|---|---|---|
| 8,954,655 B2 | 2/2015 | Jean et al. | |
| 9,507,708 B2 | 11/2016 | Chou et al. | |
| 9,514,042 B2 | 12/2016 | Chou et al. | |
| 2014/0071753 A1 | 3/2014 | Shin | |
| 2015/0006591 A1 | 1/2015 | Lee et al. | |
| 2016/0284393 A1* | 9/2016 | Ramalingam | G11C 11/5628 |
| 2017/0272494 A1* | 9/2017 | Huen | H04L 65/80 |

FOREIGN PATENT DOCUMENTS

KR 101480424 1/2015

* cited by examiner

*Primary Examiner* — Edward J Dudek, Jr.
(74) *Attorney, Agent, or Firm* — IP & T Group LLP

(57) ABSTRACT

A memory system includes a memory device including a first and a second group of memory blocks; and a controller suitable for: performing a processing operation corresponding to a plurality of workloads included in transactions received from a host, checking transaction identification information and completion information included in the workloads, storing first workloads among the workloads in the memory blocks included in the first group, corresponding to the identification information and the completion information, and transmitting and storing the first workloads into the memory blocks included in the second group.

16 Claims, 12 Drawing Sheets

MEMORY SYSTEM AND OPERATING METHOD THEREOF

CROSS-REFERENCE TO RELATED APPLICATIONS

The present application claims priority from Korean Patent Application No. 10-2016-0051451, filed on Apr. 27, 2016, which is incorporated herein by reference in its entirety.

BACKGROUND

1. Field

Exemplary embodiments of the present invention relate to a memory system and, more particularly, to a memory system processing data inputted to a memory device and an operating method of the memory system.

2. Description of the Related Art

The computer environment paradigm has shifted to ubiquitous computing systems that can be used anytime and anywhere. Due to this fact the use of portable electronic devices such as mobile phones, digital cameras, and notebook computers has rapidly increased. These portable electronic devices generally use a memory system employing a memory device for storing data, i.e., as a data storage device. The data storage device may be a main memory device or an auxiliary memory device of a portable electronic device.

Data storage devices using memory devices provide excellent stability, durability, high information access speed, and power consumption, since they have no moving parts Examples of data storage devices having such advantages include universal serial bus (USB) memory devices, memory cards having various interfaces, and solid state drives (SSD).

SUMMARY

Various embodiments of the present invention are directed to a semiconductor memory system (hereinafter simply referred to as a memory system) capable of rapidly and stably processing data inputted to a memory device by minimizing complexity and performance degradation of the memory system and maximizing memory device usage efficiency, and an operating method of the memory system.

According to an embodiment of the present invention, a memory system includes: a memory device including a first and a second group of memory blocks; and a controller suitable for: performing a processing operation corresponding to a plurality of workloads included in transactions received from a host, checking transaction identification information and completion information included in the workloads, storing first workloads among the workloads in the memory blocks included in the first group, corresponding to the identification information and the completion information, and transmitting and storing the first workloads into the memory blocks included in the second group.

The first workloads may be included in a first transaction on which the processing operation is completed in the host.

Each of the first workloads may include the identification information indicating the first transaction.

The last workload among the first workloads may include the completion information indicating that the processing operation on the first transaction is completed in the host.

The controller may store the workloads in the memory blocks of the first group, and then transmit and store the first workloads among the workloads stored in the memory blocks of the first group into the memory blocks of the second group.

The controller may distribute and store the first workloads into first memory blocks of the first group, which are coupled to each of multiple channels, and then transmit and store the first workloads into second memory blocks of the second group, which are coupled to each of the same channels as the first memory blocks.

The memory blocks of the first group may include single-level cell memory blocks, and the memory blocks of the second group may include triple-level cell memory blocks.

The transactions may be processed in units of transaction in the host, and the workloads of the transactions on which the processing operation is completed in the host and the workloads of the transactions in process may be transmitted to the controller.

The completion information may be included in the last workload among the workloads of the transactions on which the processing operation is completed.

The identification information may be included in all the workloads of the transactions.

According to another embodiment of the present invention, a method for operating a memory system includes: receiving transactions including workloads from a host for a plurality of memory blocks of a memory device, the plurality of memory blocks including a first group and a second group; checking identification information and completion information on the transactions from the workloads; storing first workloads among the workloads in the memory blocks included in the first group, corresponding to the identification information and the completion information; and transmitting and storing the first workloads into the memory blocks included in the second group.

The first workloads may be included in a first transaction on which a processing operation is completed in the host among the transactions.

Each of the first workloads may include the identification information indicating the first transaction.

The last workload among the first workloads may include the completion information indicating that the processing operation on the first transaction is completed in the host.

The workloads may be stored in the memory blocks of the first group, and then the first workloads among the workloads stored in the memory blocks of the first group may be transmitted and stored into the memory blocks of the second group.

The first workloads may be distributed and stored into first memory blocks of the first group, which are coupled to each of multiple channels, and then the first workloads may be transmitted and stored into second memory blocks of the second group, which are coupled to each of the same channels as the first memory blocks.

The memory blocks of the first group may include single-level cell memory blocks, and the memory blocks of the second group may include triple-level cell memory blocks.

The transactions may be processed in units of transaction in the host, and the workloads of the transactions on which the processing operation is completed in the host and the workloads of the transactions in process may be transmitted to a controller of the memory device.

The completion information may be included in the last workload among the workloads of the transactions on which the processing operation is completed.

The identification information may be included in all the workloads of the transactions.

DETAILED DESCRIPTION

Figure 1:
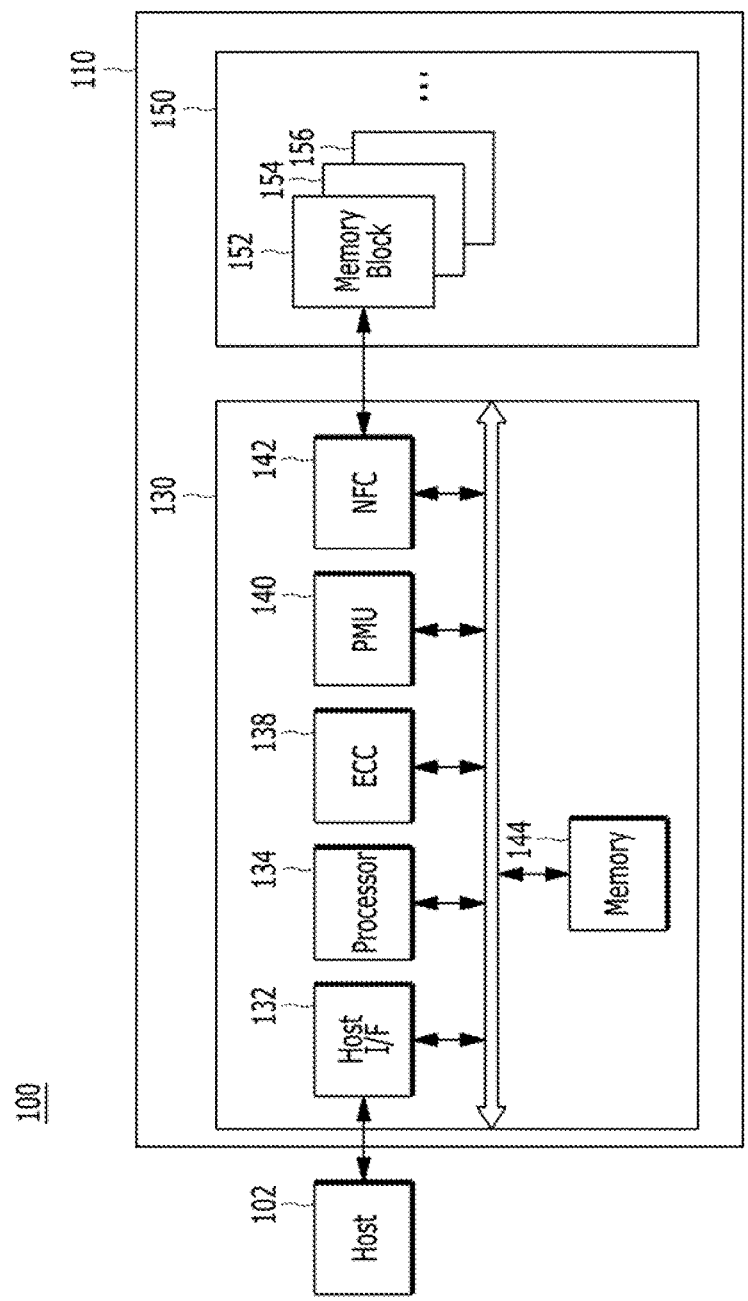
FIG. 1 is a diagram illustrating a data processing system including a memory system in accordance with an embodiment of the present invention.

Various embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Unless otherwise defined, all terms including technical and scientific terms used herein have the same meaning, as commonly understood by one of ordinary skill in the art to which the present invention pertains in view of the present disclosure. It will be further understood that terms, such as those defined in commonly used dictionaries, should be interpreted as having a meaning that is consistent with their meaning in the context of present disclosure and the pertinent art and will not be interpreted in an idealized or overly formal sense unless expressly so defined herein.

The present invention may have diverse modifications and embodiments, and herein, some of the embodiments are taken as examples to describe the concept and scope of the present invention. However, it is obvious to those skilled in the art that the embodiments do not limit the concept and scope of the present invention. Also, the constituent elements of the embodiments of the present invention should be understood to include all modifications, substitutes and equivalents. In this respect, the following embodiments shown in FIGS. 1 to 14 which are used to describe the principle of the present invention should be construed not to be restrictive but to be illustrative.

It will be further understood that, although the terms "first", "second" "third" and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising" "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

In some instances, as would be apparent to one of ordinary skill in the art elements described in connection with a particular embodiment may be used singly or in combination with other embodiments unless otherwise specifically indicated.

Hereinafter, the various embodiments of the present invention will be described in detail with reference to the attached drawings.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include a portable electronic device such as a mobile phone, an MP3 player and a laptop computer or an electronic device such as a desktop computer, a game player, a television (TV) and a projector.

The memory system 110 may operate in response to a request from the host 102, and in particular, store data to be accessed by the host 102. That is, the memory system 110 may be used as a main memory system or an auxiliary memory system of the host 102. The memory system 110 may be implemented with any one of various kinds of storage devices, according to the protocol of a host interface to be electrically coupled with the host 102. The memory system 110 may be implemented with any one of various kinds of storage devices such as a solid state drive (SSD), a multimedia card (MMC), an embedded MMC (eMMC), a reduced size MMC (RS-MMC) and a micro-MMC, a secure digital (SD) card, a mini-SD a micro-SD, a universal serial bus (USB) storage device, a universal flash storage (UFS) device, a compact flash (CF) card, a smart media (SM) card, a memory stick, and so forth.

The storage devices for the memory system 110 may be implemented with a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 may include a memory device 150 which stores data to be accessed by the host 102, and a controller 130 which may control storage of data in the memory device 150.

The controller 130 and the memory device 150 may be integrated into one semiconductor device. For instance, the controller 130 and the memory device 150 may be integrated into one semiconductor device and configure a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device and configure a memory card. The controller 130 and the memory card 150 may be integrated into one semiconductor device and configure a memory card such as a Personal Computer Memory Card International Association (PCMCIA) card, a compact flash (CF) card, a smart media (SM) card (SMC), a memory stick, a multimedia card (MMC), an RS-MMC, a micro-MMC, a secure digital (SD) card, a mini-SD, a micro-SD, an SDHC, and a universal flash storage (UFS) device.

For another instance, the memory system 110 may configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device a black box a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when a power supply is interrupted and, in particular, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 11.

The controller 130 of the memory system 110 may control the memory device 150 in response to a request from the host 102. The controller 130 may provide the data read from the memory device 150, to the host 102, and store the data provided from the host 102 into the memory device 150. Therefore, the controller 130 may control overall operations of the memory device 150, such as read, write, program and erase operations.

In detail, the controller 130 may include a host interface unit 132, a processor 134, an error correction code (ECC) unit 138, a power management unit 140, a NAND flash controller 142 and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. For example, the NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
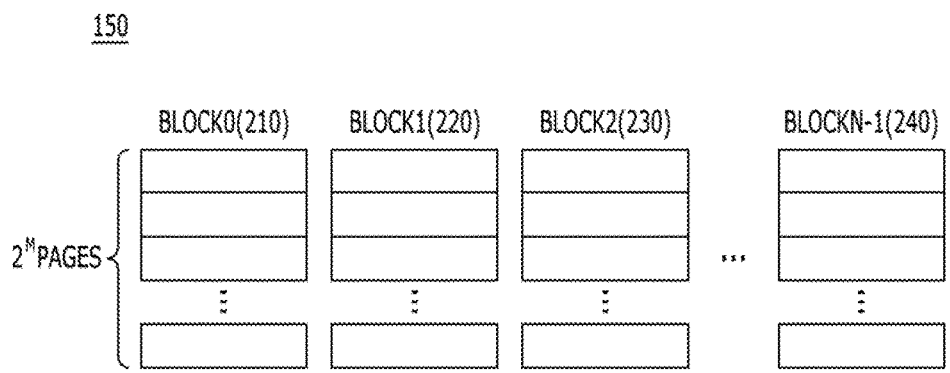
FIG. 2 is a diagram illustrating a memory device in the memory system shown in FIG. 1.

FIG. 2 is a schematic diagram illustrating the memory device 150 shown in FIG. 1.

Referring to FIG. 2, the memory device 150 may include a plurality of memory blocks. For example, the memory device 150 may include zeroth to $(N-1)^{th}$ blocks 210 to 240. Each of the plurality of memory blocks 210 to 240 may include a plurality of pages. For example, each of the plurality of memory blocks 210 to 240 may include $2^M$ number of pages ($2^M$ PAGES), to which the present invention will not be limited. Each of the plurality of pages may include a plurality of memory cells to which a plurality of word lines are electrically coupled.

Additionally, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data (e.g., two or more-bit data). An MLC memory block including a plurality of pages which are implemented with memory cells that are each capable of storing 3-bit data may be defined as a triple level cell (TLC) memory block.

Each of the plurality of memory blocks 210 to 240 may store the data provided from the host 102 during a write operation, and may provide stored data to the host 102 during a read operation.

Figure 3:
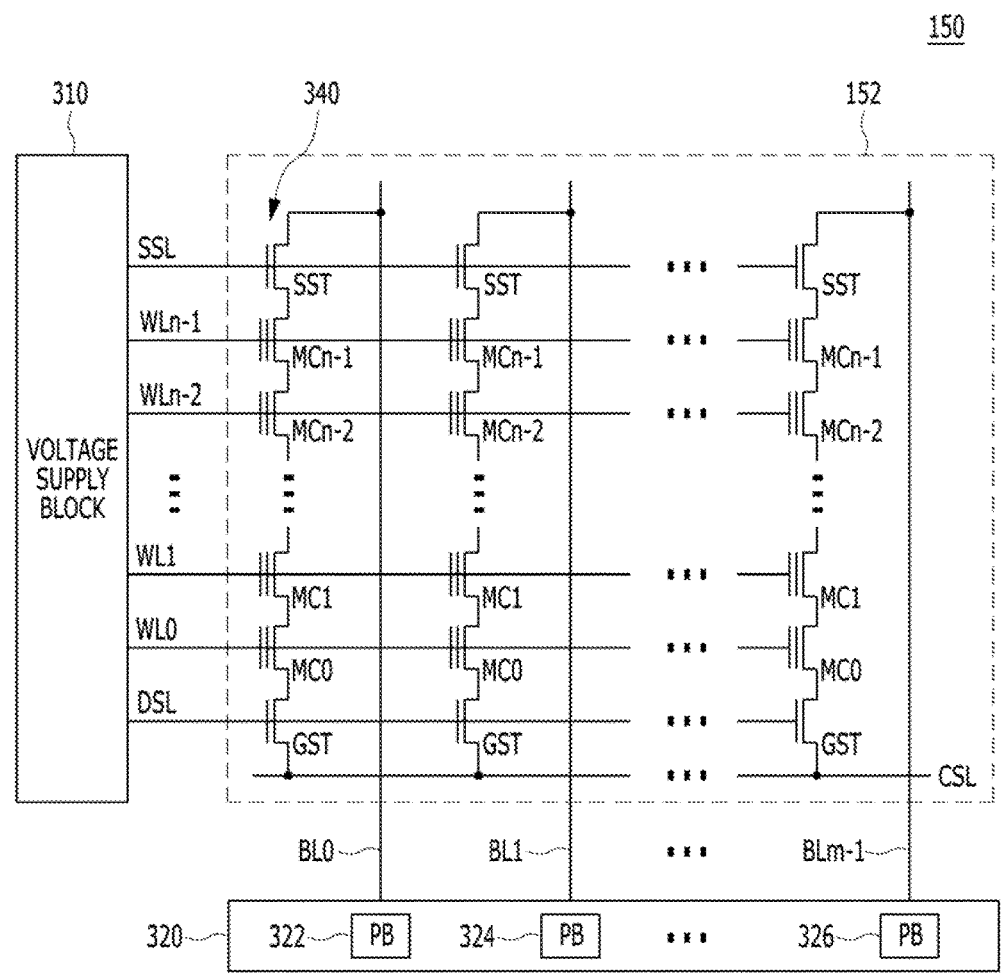
FIG. 3 is a circuit diagram illustrating a memory block in a memory device, in accordance with an embodiment of the present invention.

FIG. 3 is a circuit diagram illustrating one of the plurality of memory blocks 152 to 156 shown in FIG. 1.

Referring to FIG. 3, the memory block 152 of the memory device 150 may include a plurality of cell strings 340 which are electrically coupled to bit lines BL0 to BLm-1, respectively. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured by multi-level cells (MLC) each of which stores data information of a plurality of bits. The strings 340 may be electrically coupled to the corresponding bit lines BL0 to BLm-1, respectively. For reference, in FIG. 3, 'DSL' denotes a drain select line, 'SSL' denotes a source select line, and 'CSL' denotes a common source line.

While FIG. 3 shows, as an example the memory block 152 which is configured by NAND flash memory cells, it is to be noted that the memory block 152 of the memory device 150 is not limited to NAND flash memory cells and may be realized by NOR flash memory cells, hybrid flash memory cells in which at least two kinds of memory cells are combined, or one-NAND flash memory cell in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages such as a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit and may serve as a sense amplifier or a write driver according to an operation mode. During a verification/normal read operation the read/write circuit 320 may serve as a sense amplifier for reading data from the memory cell array. Additionally, during a program operation the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. The read/write circuit 320 may include a plurality of page buffers 322, 324 and 326 respectively corresponding to columns or bit lines, or pairs of columns or pairs of bit lines, and a plurality of latches (not shown) may be included in each of the page buffers 322, 324 and 326.

FIGS. 4 to 11 are diagrams illustrating the memory device 150 shown in FIG. 1.

Figure 4:
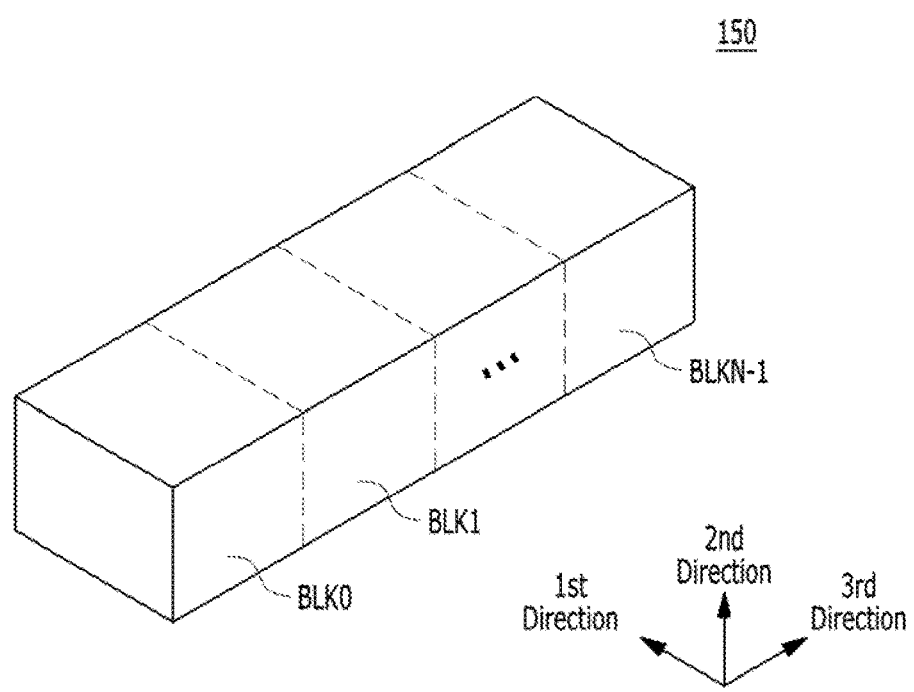
FIGS. 4 to 11 are diagrams illustrating the memory device shown in FIG. 2.

FIG. 4 is a block diagram illustrating an example of the plurality of memory blocks included in the memory device 150 shown in FIG. 1.

Referring to FIG. 4, the memory device 150 may include a plurality of memory blocks BLK0 to BLKN-1, and each of the memory blocks BLK0 to BLKN-1 may be realized in a three-dimensional (3D) structure or a vertical structure. The respective memory blocks BLK0 to BLKN-1 may include structures which extend in first to third directions (e.g., an x-axis direction, a y-axis direction and a z-axis direction).

The respective memory blocks BLK0 to BLKN-1 may include a plurality of NAND strings NS which extend in the second direction. The plurality of NAND strings NS may be provided in the first direction and the third direction. Each NAND string NS may be electrically coupled to a bit line BL, at least one source select line SSL, at least one ground select line GSL, a plurality of word lines WL, at least one dummy word line DWL, and a common source line CSL. That is, the respective memory blocks BLK0 to BLKN−1 may be electrically coupled to a plurality of bit lines BL, a plurality of source select lines SSL, a plurality of ground select lines GSL, a plurality of word fines WL, a plurality of dummy word lines DWL, and a plurality of common source lines CSL.

Figure 5:
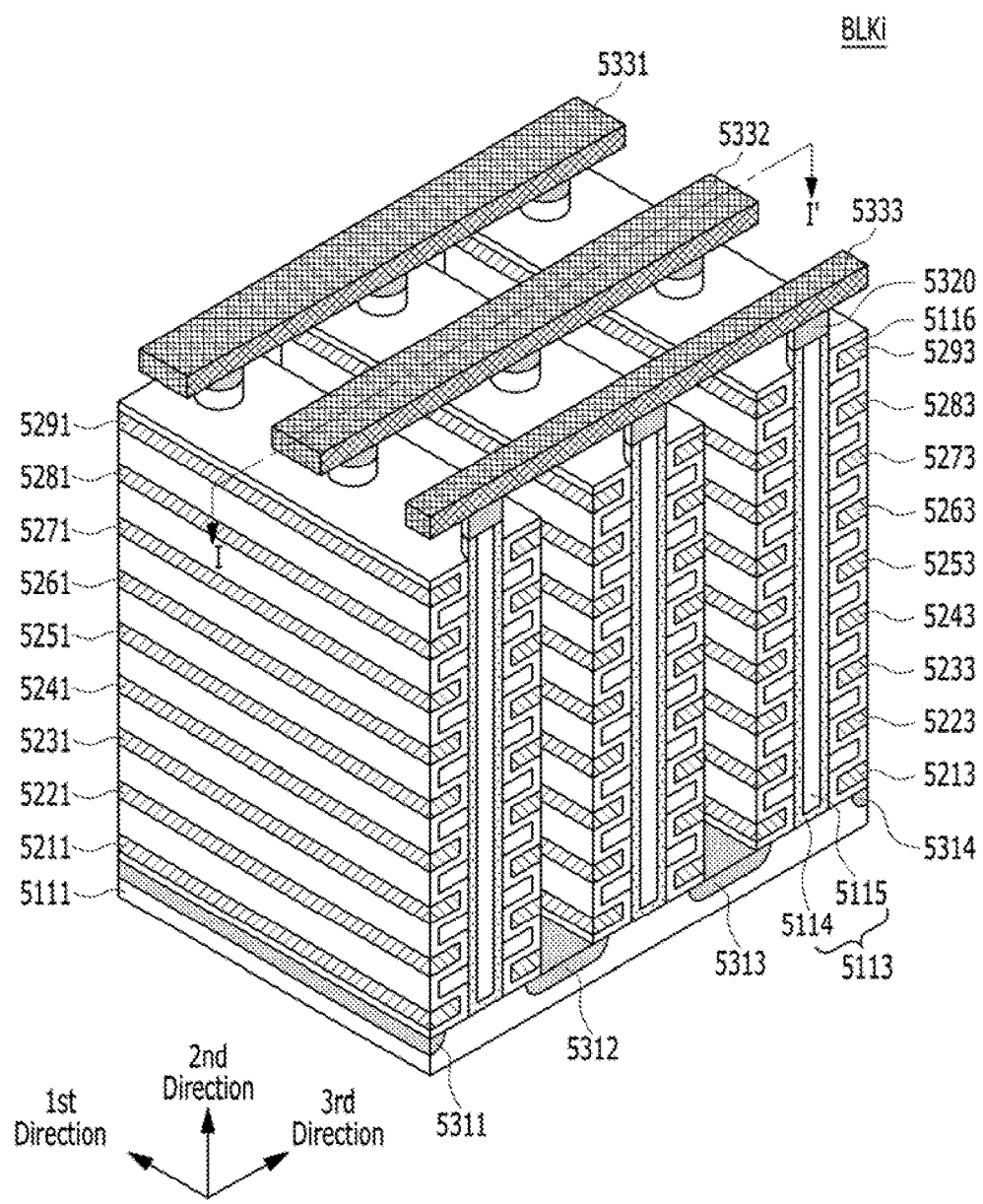
Figure 6:
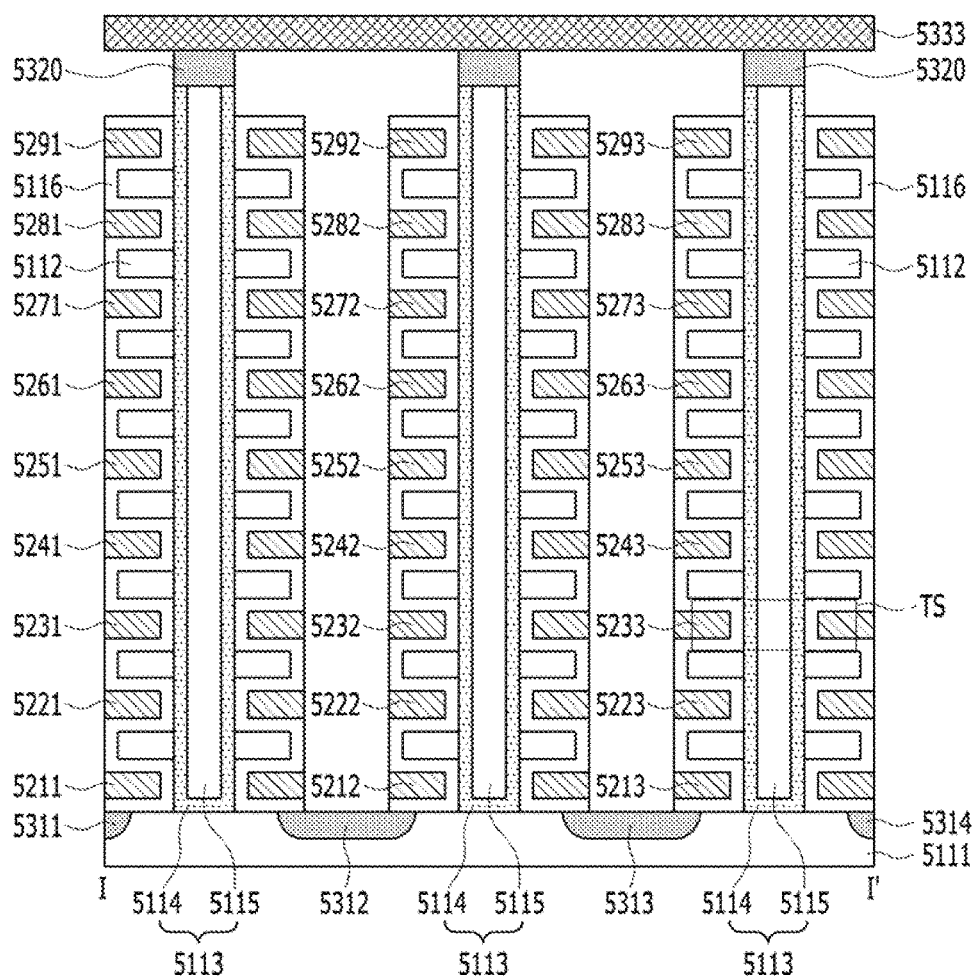

FIG. 5 is a perspective view of one BLKi of the plural memory blocks BLK0 to BLKN−1 shown in FIG. 4. FIG. 6 is a cross-sectional view taken along a line I-I' of the memory block BLKi shown in FIG. 5.

Referring to FIGS. 5 and 6, a memory block BLKi among the plurality of memory blocks of the memory device 150 may include a structure which extends in the first to third directions.

A substrate 5111 may be provided. The substrate 5111 may include a silicon material doped with a first type impurity. The substrate 5111 may include a silicon material doped with a p-type impurity or may be a p-type well (e.g., a pocket p-well), and include an n-type well which surrounds the p-type well. While it is assumed that the substrate 5111 is p-type silicon, it is to be noted that the substrate 5111 is not limited to being p-type silicon.

A plurality of doping regions 5311 to 5314 which extend in the first direction may be provided over the substrate 5111. The plurality of doping regions 5311 to 5314 may contain a second type of impurity that is different from the substrate 5111. The plurality of doping regions 5311 to 5314 may be doped with an n-type impurity. Although in this embodiment the first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric materials 5112 which extend in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide.

In the region over the substrate 5111 between the first and second doping regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be electrically coupled with the substrate 5111. Each pillar 5113 may be configured by a plurality of materials. The surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. That is, a region in which a material other than the dielectric material 5112 and the dielectric layer 5116 may be disposed, may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doping regions 5311 and 5312, conductive materials 5211 to 5291 may be provided over the exposed surface of the dielectric layer 5116. The conductive material 5211 which extends in the first direction may be provided between the dielectric material 5112 adjacent to the substrate 5111 and the substrate 5111. In particular, the conductive material 5211 which extends in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material which extends in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 which extend in the first direction may be provided between the dielectric materials 5112. The conductive material 5291 which extends in the first direction may be provided over the uppermost dielectric material 5112. The conductive materials 5211 to 5291 which extend in the first direction may be a metallic material. The conductive materials 5211 to 5291 which extend in the first direction may be a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 which extend in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 which extend in the first direction may be provided.

Drains 5320 may be respectively provided over the plurality of pillars 5113. The drains 5320 may be silicon materials doped with second type impurities. The drains 5340 may be silicon materials doped with n-type impurities. Although in this embodiment the drains 5320 include n-type silicon, it is to be noted that the drains 5320 are not limited to being n-type silicon. Furthermore the width of each drain 5320 may be larger than the width of each corresponding pillar 5113. Each drain 5320 may be provided in the shape of a pad over the top surface of each corresponding pillar 5113.

Conductive materials 5331 to 5333 which extend in the third direction may be provided over the drains 5320. The conductive materials 5331 to 5333 may be sequentially disposed in the first direction. The respective conductive materials 5331 to 5333 may be electrically coupled with the drains 5320 of corresponding regions. The drains 5320 and the conductive materials 5331 to 5333 which extend in the third direction may be electrically coupled with through contact plugs. The conductive materials 5331 to 5333 which extend in the third direction may be a metallic material. The conductive materials 5331 to 5333 which extend in the third direction may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293 which extend in the first direction. The respective pillars 5113 may form NAND strings NS together with the dielectric layer 5116 and the conductive materials 5211 to 5291, 5212 to 5292 and 5213 to 5293 which extend in the first direction. Each NAND string NS may include a plurality of transistor structures TS.

Figure 7:
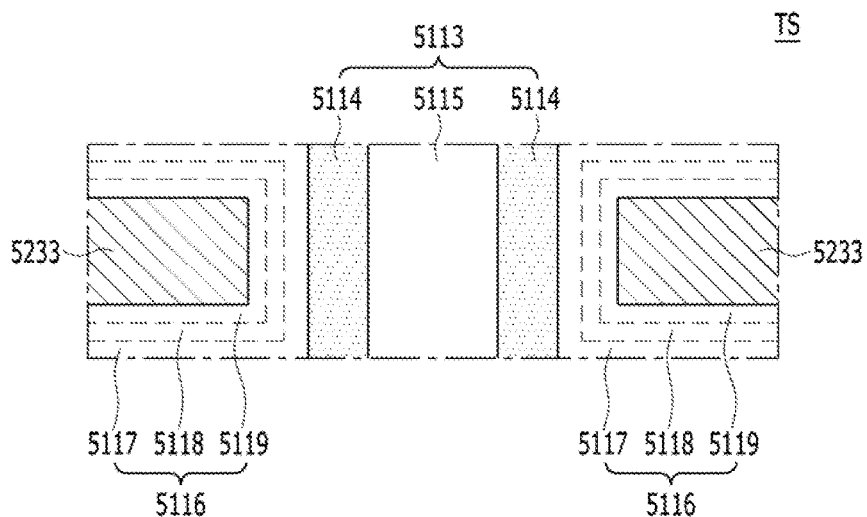

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillar 5113. That is, the memory block BLKi may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 which extend in the first direction. That is, the gates or the control gates may extend in the first direction and form word lines, at least two select lines, at least one source select line SSL and at least one ground select line GSL.

The conductive materials 5331 to 5333 which extend in the third direction may be electrically coupled to one end of the NAND strings NS. The conductive materials 5331 to 5333 which extend in the third direction may serve as bit lines BL. That is, in one memory block BLKi, the plurality of NAND strings NS may be electrically coupled to one bit line BL.

The second type doping regions 5311 to 5314 which extend in the first direction may be provided to the other ends of the NAND strings NS. The second type doping regions 5311 to 5314 which extend in the first direction may serve as common source lines CSL.

Furthermore, the memory block BLKi may include a plurality of NAND strings NS which extend in a direction perpendicular to the substrate 5111, such as, the second direction, and may serve as a NAND flash memory block, for example, of a charge capturing type memory, in which a plurality of NAND strings NS are electrically coupled to one bit line BL.

While it is illustrated in FIGS. 5 to 7 that the conductive materials 5211 to 5291, 5212 to 5292 and 5213 to 5293 which extend in the first direction are provided in 9 layers, it is to be noted that the conductive materials 5211 to 5291, 5212 to 5292 and 5213 to 5293 which extend in the first direction are not limited to being provided in 9 layers. For example, conductive materials which extend in the first direction may be provided in 8 layers, 16 layers or any multiple of layers. That is, in one NAND string NS, the number of transistors may be 8, 16 or more.

While it is illustrated in FIGS. 5 to 7 that 3 NAND strings NS are electrically coupled to one bit line BL, it is to be noted that the embodiment is not limited to having 3 NAND strings NS that are electrically coupled to one bit line L. In the memory block BLKi, m number of NAND strings NS may be electrically coupled to one bit line BL, m being a positive integer. According to the number of NAND strings NS which are electrically coupled to one bit line BL, the number of conductive materials 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are electrically coupled to one conductive material which extends in the first direction, it is to be noted that the embodiment is not limited to having 3 NAND strings NS electrically coupled to one conductive material which extends in the first direction. For example, n number of NAND strings NS may be electrically coupled to one conductive material which extends in the first direction, n being a positive integer. According to the number of NAND strings NS which are electrically coupled to one conductive material which extends in the first direction, the number of bit lines 5331 to 5333 may be controlled as well.

Figure 8:
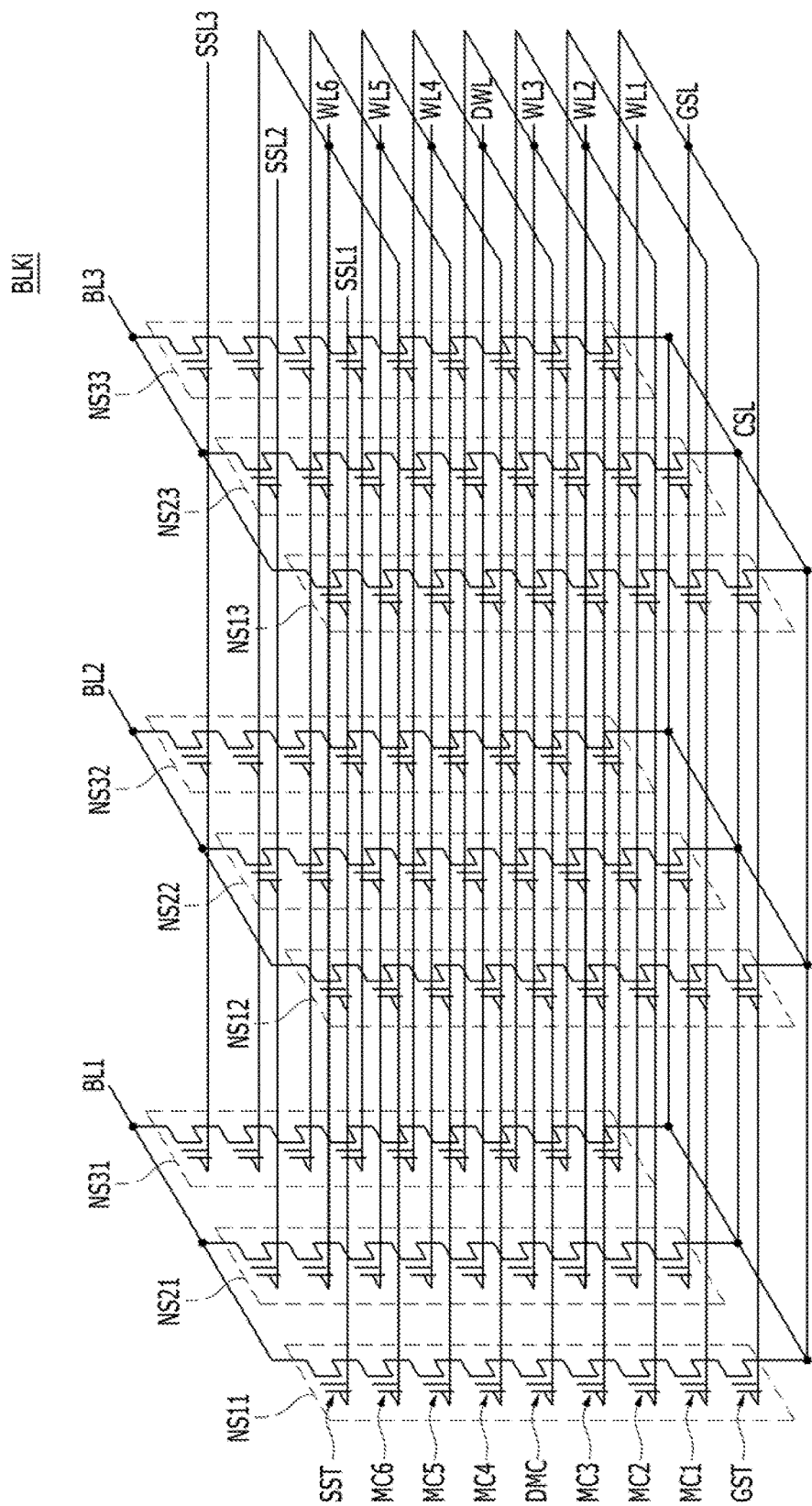

FIG. 8 is an equivalent circuit diagram illustrating the memory block BLKi having a first structure described with reference to FIGS. 5 to 7.

Referring to FIG. 8 in a block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to N532 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BL3 and the common source line CSL. The third bit line BL3 may correspond to the conductive material 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In this example, NAND strings NS may be defined by units of rows and columns, and NAND strings NS which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. The NAND strings NS11 to NS13 which are electrically coupled to a first source select line SSL1 may form a first row, the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is, at the same height, the word lines WL electrically coupled to the memory cells MC of the NAND strings NS in different rows may be electrically coupled. Dummy memory cells DMC at the same height in the NAND strings NS of the same row may share a dummy word line DWL. That is, at the same height or level, the dummy word lines DWL electrically coupled to the dummy memory cells DMC of the NAND strings NS in different rows may be electrically coupled.

The word lines WL or the dummy word lines DWL located at the same level or height or layer may be electrically coupled with one another at layers where the conductive materials 5211 to 5291, 5212 to 5292 and 5213 to 5293 which extend in the first direction may be provided. The conductive materials 5211 to 5291, 5212 to 5292 and 5213 to 5293 which extend in the first direction may be electrically coupled in common to upper layers through contacts. At the upper layers, the conductive materials 5211 to 5291, 5212 to 5292 and 5213 to 5293 which extend in the first direction may be electrically coupled. The ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings NS. Over the active regions and over the substrate 5111, the first to fourth doping regions 5311 to 5314 may be electrically coupled. The first to fourth doping regions 5311 to 5314 may be electrically coupled to an upper layer through contacts and, at the upper layer, the first to fourth doping regions 5311 to 5314 may be electrically coupled.

As shown in FIG. 8, the word lines WL of the same height or level may be electrically coupled. Accordingly, when a word line WL at a specific height is selected, all NAND strings NS which are electrically coupled to the word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells for example, MC1 to MC3, adjacent to the ground select transistor GST may be referred to as a lower memory cell group, and memory cells, for example, MC4 to MC6, adjacent to the string select transistor SST may be referred to as an upper memory cell group.

Hereinbelow, detailed descriptions will be made with reference to FIGS. 9 to 11, which show the memory device in the memory system in accordance with an embodiment implemented with a three-dimensional (3D) nonvolatile memory device different from the first structure.

Figure 9:
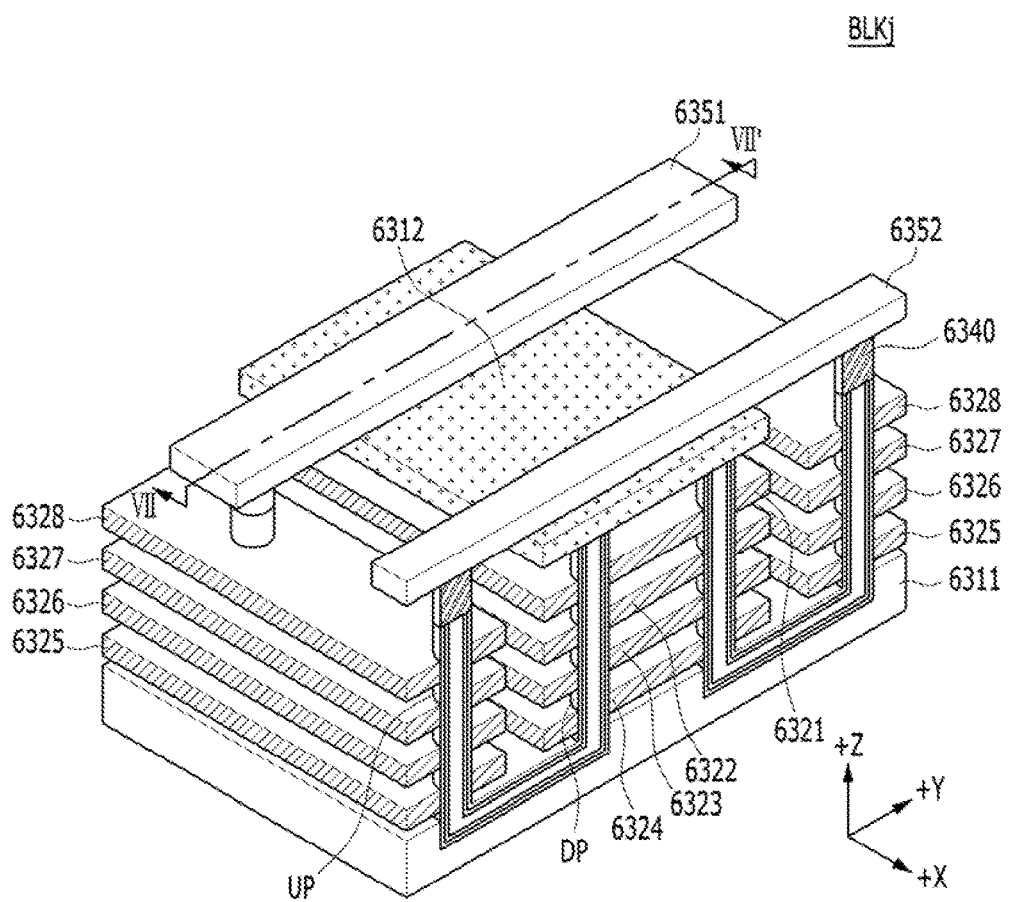

FIG. 9 is a perspective view schematically illustrating the memory device implemented with the three-dimensional (3D) nonvolatile memory device, which is different from the first structure described above with reference to FIGS. 5 to 8, and showing a memory block BLKj of the plurality of memory blocks of FIG. 4. FIG. 10 is a cross-sectional view illustrating the memory block BLKj taken along the line VII-VII' of FIG. 9.

Figure 10:
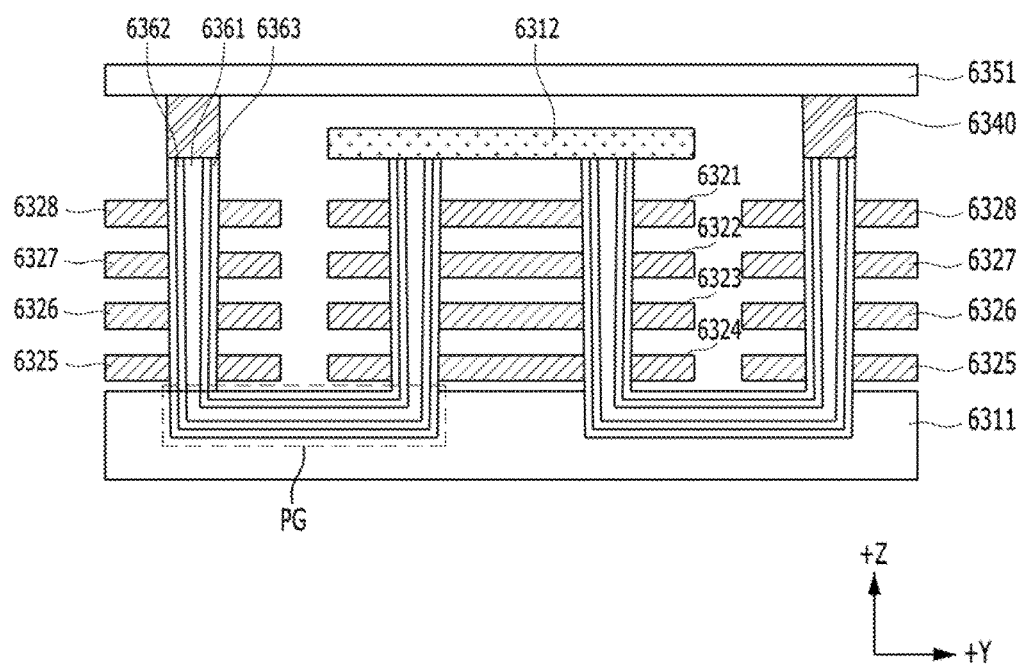

Referring to FIGS. 9 and 10, the memory block BLKj among the plurality of memory blocks of the memory device 150 of FIG. 1 may include structures which extend in the first to third directions.

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. Although in this embodiment the substrate 6311 is p-type silicon, it is to be noted that the substrate 6311 is not limited to being p-type silicon.

First to fourth conductive materials 6321 to 6324 which extend in the x-axis direction and the y-axis direction are provided over the substrate 6311. The first to fourth conductive materials 6321 to 6324 may be separated by a predetermined distance in the z-axis direction.

Fifth to eighth conductive materials 6325 to 6328 which extend in the x-axis direction and the y-axis direction may be provided over the substrate 6311. The fifth to eighth conductive materials 6325 to 6328 may be separated by the predetermined distance in the z-axis direction. The fifth to eighth conductive materials 6325 to 6328 may be separated from the first to fourth conductive materials 6321 to 6324 in the y-axis direction.

A plurality of lower pillars DP which pass through the first to fourth conductive materials 6321 to 6324 may be provided. Each lower pillar DP extends in the z-axis direction. Additionally, a plurality of upper pillars UP which pass through the fifth to eighth conductive materials 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be electrically coupled through a pipe gate PG. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352 which extend in the y-axis direction may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be electrically coupled through contact plugs. The first and second upper conductive materials 6351 and 6352 respectively serve as first and second bit lines BL1 and BL2.

The first conductive material 6321 may serve as a source select line SSL the second conductive material 6322 may serve as a first dummy word line DWL1, and the third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string may be electrically coupled through the pipe gate PG. One end of the lower string may be electrically coupled to the doping material 6312 of the second type which serves as the common source line CSL. One end of the upper string may be electrically coupled to a corresponding bit line through the drain 6340. One lower string and one upper string form one cell string which is electrically coupled between the doping material 6312 of the second type serving as the common source line CSL and a corresponding one of the upper conductive material layers 6351 and 6352 serving as the bit line BL.

That is, the lower string may include a source select transistor SST, the first dummy memory cell DMC1 and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
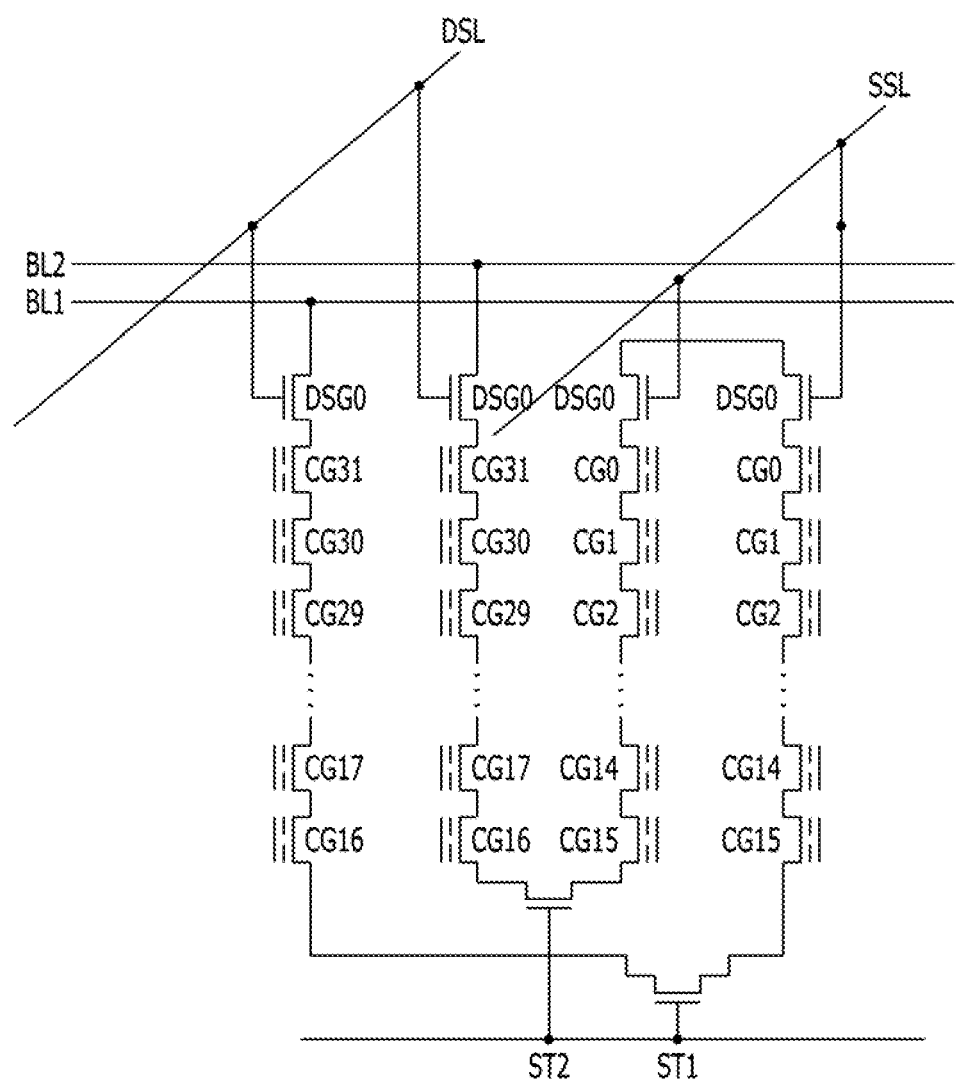

FIG. 11 is a circuit diagram illustrating the equivalent circuit of the memory block BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure among the plurality of blocks of the memory device 150, cell strings, each of which is implemented with one upper string and one lower string electrically coupled through the pipe gate PG as described above with reference to FIGS. 9 and 10, may be provided in such a way as to define a plurality of pairs.

That is, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be electrically coupled to the same drain select line DSL and the same source select line SSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same source, select line SSL, it may be envisaged that the first string ST1 and the second string ST2 may be electrically coupled to the same source select line SSL and the same bit line BL, the first string ST1 may be electrically coupled to a first drain select line DSL1 and the second string ST2 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

According to an embodiment of the present invention, a data process to a memory device included in a memory system is described in detail below with reference to FIGS. 12 to 14. For example, a data process in which a workload requested from the host 102 is processed to the memory device 150 will be described.

Figure 12:
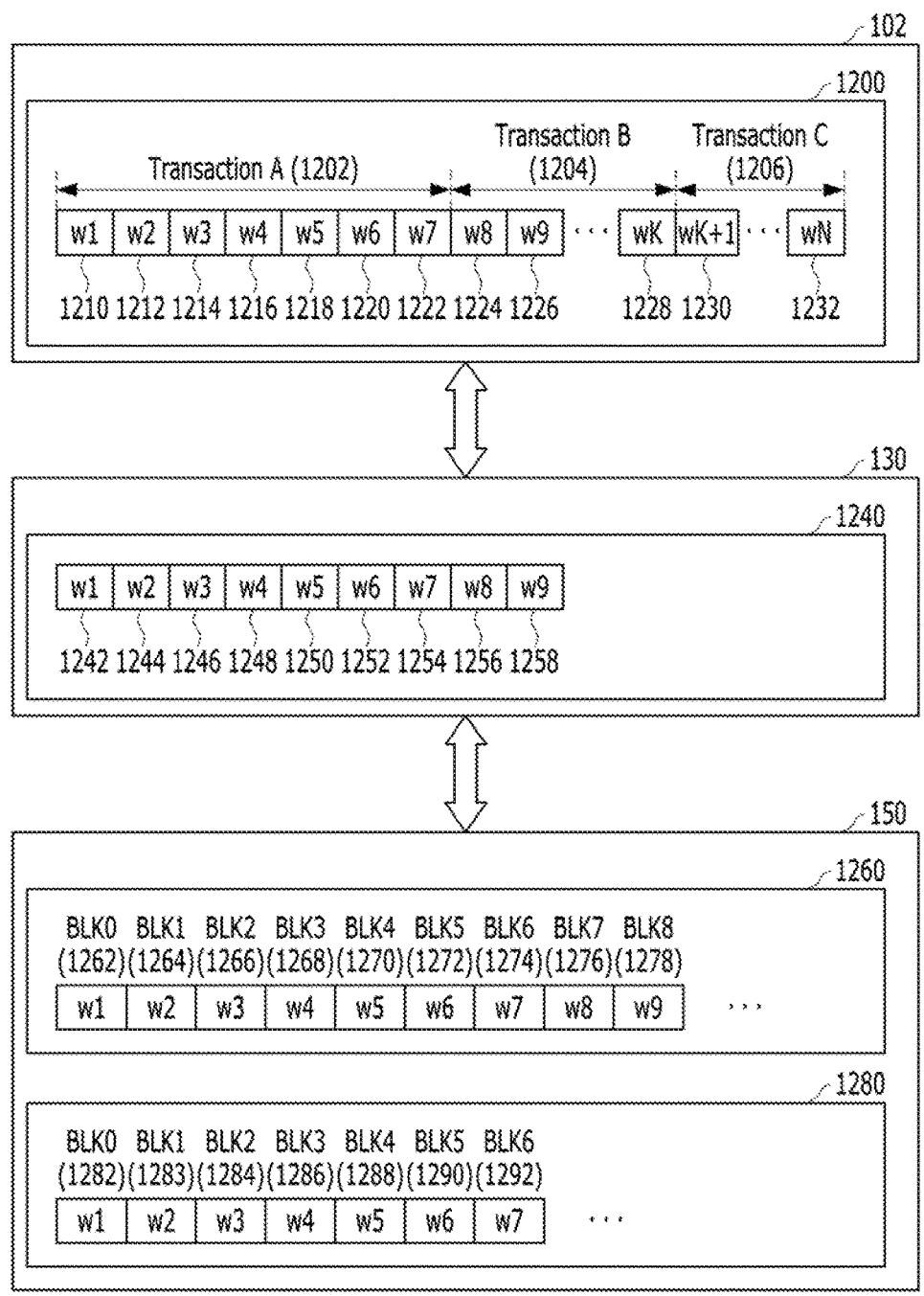
FIGS. 12 and 13 are diagrams illustrating examples of a data processing operation of a memory system, according to an embodiment of the present invention.
Figure 13:
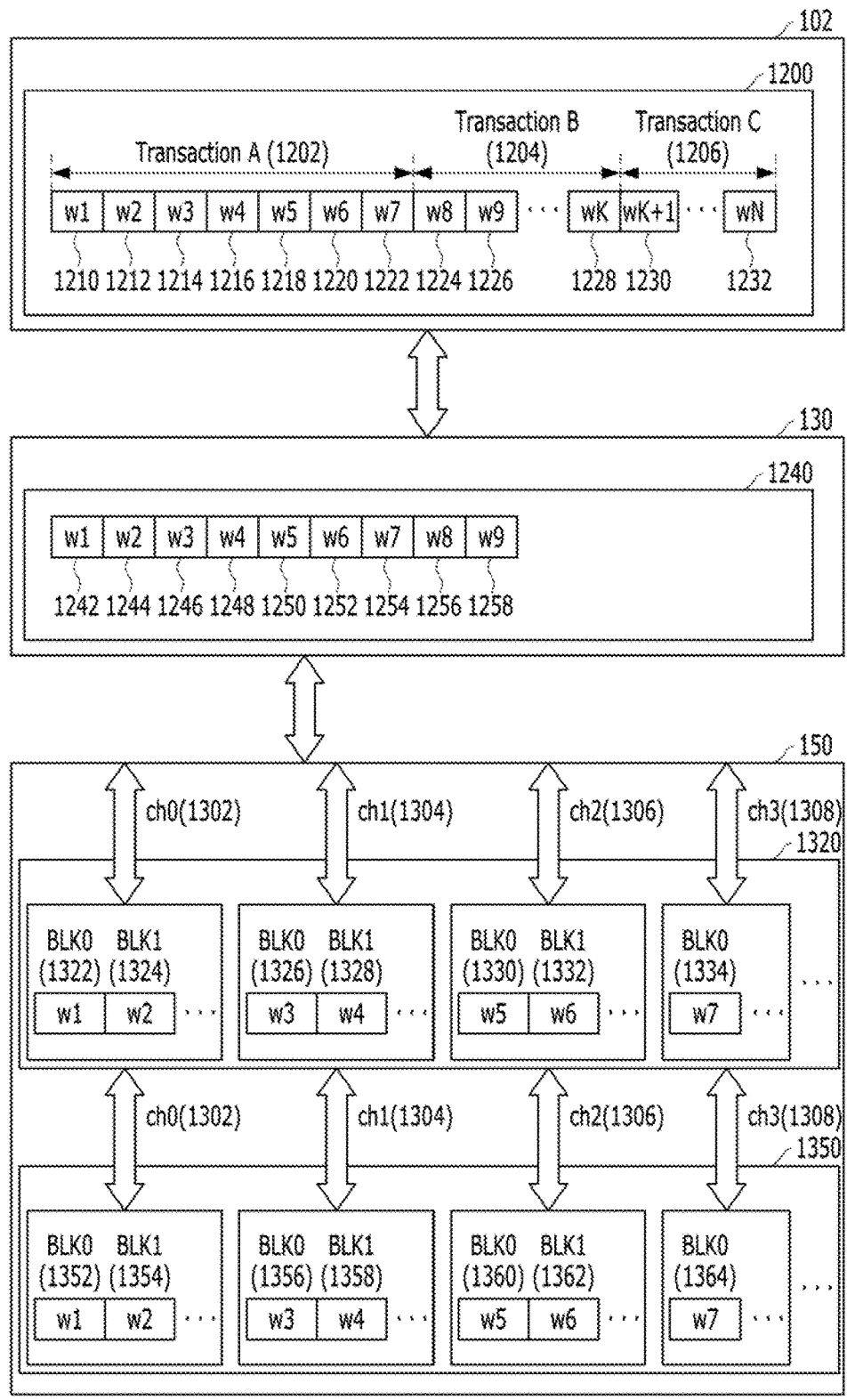

FIGS. 12 and 13 are diagrams illustrating a data processing operation of a memory system, according to an embodiment of the present invention.

The memory system 110 shown in FIG. 1 may store data corresponding to a command received from the host 102. For example, the memory system 110 may store a read data corresponding to a read command or a write data corresponding to a write command in a buffer/cache included in the memory 144 of the controller 130. Subsequently, the memory system 110 may perform a command operation corresponding to the command received from the host 102. For example the memory system 110 may read or write the data stored in the buffer/cache to a plurality of memory blocks included in the memory device 150. The memory system 110 may perform a command operation on the command data corresponding to the commands received from the host 102. For example, the memory system 110 may perform a data read operation corresponding to the read command or a data program operation corresponding to the write command.

Although it is described as an example that the controller 130 performs a data processing operation in the memory system 110, as described above, the processor 134 included in the controller 130 may perform a data process through a flash translation layer (FTL). The controller 130 may store a user data corresponding to the write command received from the host 102 in the buffer included in the memory 144 of the controller 130, and then may program the user data stored in the buffer into a memory block among the memory blocks included in the memory device 150. In other words, the controller 130 may perform a program operation on the user data stored in the buffer. In addition, the controller 130 may read a user data corresponding to the read command received from the host 102 in a plurality of pages included in a corresponding memory block of the memory device 150 and may store the user data in the buffer included in the memory 144 of the controller 130. Then the controller 130 may provide the host 102 with the data stored in the buffer. In other words, the controller 130 may perform a read operation on the user data stored in the buffer.

According to an embodiment of the present invention, the host 102 may perform a processing operation based on a user's request in units of transaction including a plurality of workloads. The controller 130 may perform the command operation corresponding to the command received from the host 102 and process the workloads included in the transaction. A data processing operation including the controller 130 processing a plurality of workloads of a transaction received from the host 102 with the memory device 150 is described in detail below.

Referring now to FIG. 12, the host 102 may store a plurality of transactions in a host memory 1200. For example, the plurality of transactions may include a transaction A 1202, a transaction B 1204 and a transaction C 1206. The host 102 may process the transactions A 1202, B 1204 and C 1206 stored in the host memory 1200 in units of transaction and perform a processing operation based on a user's request. Each of the transactions A 1202, B 1204 and C 1206 processed by the host 102 may include a plurality of workloads. For example, the transaction A 1202 may include a workload w1 1210, a workload w2 1212, a workload w3 1214, a workload w4 1215, a workload w5 1218, a workload w6 1220, and a workload w7 1222. Likewise, the transaction B 1204 may include a plurality of workloads including workload w8 1224, a workload w9 1226, and wK 1228. Likewise, he transaction C 1206 may include workloads, workload w(K+1) 1230, . . . , and a workload wN 1232.

The workloads w1-w7 of the transaction 1202, the workloads w8-WK of the transaction 1204, and the workloads wk+1-Wn of the transaction 1206 may include identification information indicating their respective transactions. For example, the workload w1 1210, the workload w2 1212, the workload w3 1214, the workload w4 1216, the workload w5 1218, the workload w6 1220, and the workload w7 1222 may include identification information indicating the transaction A 1202. The workloads w8 1224—the workload wK 1228 may include identification information indicating the transaction B 1204. The workloads w(K+1) 1230-wN 1232 may include identification information indicating the transaction C 1206. Moreover, The last workloads of the transactions A 1202, B 1204 and C 1206 may include information indicating that they are the last workloads in their respective transactions. For example, the workload w7 1222 of the transaction A 1202, the workload wK 1228 of the transaction B 1204 and the workload wN 1232 of the transaction C 1206 may include completion information indicating that a processing operation of their respective transactions A 1202, B 1204, and C 1206 is completed through the last workload process.

The host 102 may transmit the commands for the transactions A 1202, B 1204 and C 1206, which include the workloads of each transaction corresponding to the commands, to the controller 130 based on the user's request. In other words, according to the data processing system shown in FIG. 1, the host 102 may perform the processing operation in units of transaction based on the user's request, and the memory system 110 including the controller 130 and the memory device 150 may perform the command operation processing the workloads of the transactions A 1202, B 1204 and C 1206 based on the user's request. Hence, the host 102 may transmit the workloads w1-w7 (i.e., 1210, 1212, 1214, 1216, 1218, 1220 and 1220), w8-wk (i.e., 1224, 1226, . . . and 1228), wK+1-wN (i.e., 1230, . . . , 1232) of the transactions A 1202, B 1204 and C 1206, respectively, to the controller 130 so that the memory system 110 may perform the command operation. For the sake of convenience in description, a case where the host 102 transmits the workload w1 1210, the workload w2 1212, the workload w3 1214, the workload w4 1216, the workload w5 1218, the workload w6 1220 and the workload w7 1222 of the transaction A 1202 and the workload w8 1224 and the workload w9 1226 of the transaction B 1204, which are stored in the host memory 1200, to the controller 130 is described below in detail.

When the controller 130 receives the workloads w1 1210, w2 1212, w3 1214, w4 1216, w5 1218, w6 1220 and w7 1222 of the transaction A 1202 and the workloads w8 1224 and w9 1226 of the transaction B 1204 from the host 102 to perform the command operation based on the user's request, the controller 130 may store the received workloads in the buffer 1240 included in the memory 144 of the controller 130. The controller 130 may store workload w1 1242, workload w2 1244, workload w3 1246, workload w4 1248, workload w5 1250, workload w6 1252, workload w7 1254, workload w8 1256 and workload w9 1258, in the buffer 1240 included in the memory 144 of the controller 130.

The workloads 1242, 1244, 1246, 1248, 1250, 1252, 1254, 1256 and 1258 stored in the buffer 1240 of the controller 130 may include identification information indicating their corresponding transactions. In other words, the workload w1 1242, the workload w2 1244, the workload w3 1246, the workload w4 1248, the workload w5 1250, the workload w6 1252 and the workload w7 1254 may include identification information indicating the transaction A 1202, and the workload w8 1256 and a workload w9 1258 may include identification information indicating the transaction B 1204. The workload w7 1254 stored in the buffer 1240 of the controller 130 may include completion information indicating that the workload is the last workload of the transaction A 1202.

The controller 130 may check the identification information indicating the transaction A 1202 which is included in the workload w1 1242, the workload w2 1244, the workload w3 1246, the workload w4 1248, the workload w5 1250, the workload w6 1252, and the workload w7 1254, and also may check the completion information included in the workload w7 1254. The controller 130 may also check the identification information indicating the transaction B 1204, which is included in the workload w8 1256 and the workload w9 1258.

The controller 130 may store the workload w1 1242, the workload w2 1244, the workload w3 1246, the workload w4 1248, the workload w5 1250, the workload w6 1252, the workload w7 1254, the workload w8 1256 and the workload w9 1258 stored in the buffer 1240 in memory blocks included in a first memory block group 1260 among a plurality of memory blocks included in the memory device 150 shown in FIG. 1. In other words, the controller 130 may store the workload w1 1242, the workload w2 1244, the workload w3 1246, the workload w4 1248, the workload w5 1250, the workload w6 1252, the workload w7 1254, the workload w8 1256 and the workload w9 1258 stored in the buffer 1240, in a memory block BLK0 1262, a memory block BLK1 1264, a memory block BLK2 1266, a memory block BLK3 1268, a memory block BLK4 1270, a memory block BLK5 1272, a memory block BLK6 1274 a memory block BLK7 1276 and a memory block BLK8 1278, respectively, included in the memory device 150 shown in FIG. 1. According to an embodiment of the present invention, for the sake of convenience in description, it is described in detail below as an example that the workload w1 1242 is stored in the memory block BLK0 1262, and the workload w2 1244 is stored in the memory block BLK1 1264, and the workload w3 1246 is stored in the memory block BLK2 1266, and the workload w4 1248 is stored in the memory block BLK3 1268, and the workload w5 1250 is stored in the memory block BLK4 1270, and the workload w6 1252 is stored in the memory block BLK5 1272, and the workload w7 1254 is stored in the memory block BLK6 1274, and the workload w8 1256 is stored in the memory block BLK7 1276, and the workload w9 1258 is stored in the memory block BLK8 1278.

As described above, the controller 130 may store the workloads 1242, 1244, 1246, 1248, 1250, 1252, 1254, 1256 and 1258 stored in the buffer 1240 in the memory blocks 1262, 1264, 1266, 1268, 1270, 1272, 1274, 1276 and 1278, respectively, included in the first memory block group 1260 of the memory device 150.

The first memory block group 1260 among the memory blocks of the memory device 150 may include single-level cell (SLC) memory blocks or multi-level cell (MLC) memory blocks, and a second memory block group 1280 may include multi-level cell memory blocks, for example, triple-level cell (TLC) memory blocks. Hereinafter, for the sake of convenience in description, it is described in detail as example that the first memory block group 1260 includes the single-level cell memory blocks, and the second memory block group 1280 includes the multi-level cell memory blocks, for example, the triple-level cell memory blocks. According to an embodiment of the present invention as described above, when the first memory block group 1260 includes the single-level cell memory blocks, the single-level cell memory blocks may be used as buffers.

In other words, the controller 130 may use the memory blocks 1262, 1264, 1266, 1268, 1270, 1272, 1274, 1276 and 1278 of the first memory block 1260 including the single-level cell memory blocks as the buffers. The controller 130 may check the transaction identification information and the transaction completion information included in each of the workloads w1, w2, w3, w4, w5, w6, w7, w8 and w9 stored in the memory blocks 1262, 1264, 1266, 1268, 1270, 1272, 1274, 1276 and 1278 of the first memory block group 1260. In the illustrated example, the controller 130 may thus check that the processing operation on the transaction A 1202 is completed in the host 102 through the identification information indicating the transaction A 1202 included in the workload w1 1242, the workload w2 1244, the workload w3 1246, the workload w4 1248, the workload w5 1250, the workload w6 1252 and the workload w7 1254, and the completion information on the transaction A 1202 included in the workload w7 1254.

In addition, the controller 130 may transmit and store the workloads of the transaction A 1202 on which the processing operation is completed in the host 102 among the workloads w1, w2, w3, w4, w5, w6, w7, w8 and w9 stored in the memory blocks 1262, 1264, 1266, 1268, 1270, 1272, 1274, 1276 and 1278 of the first memory block group 1260 into memory blocks 1282, 1283, 1284, 1286, 1288, 1290 and 1292 included the second memory block group 1280. In other words, the controller 130 may transmit and store the workloads w1, w2, w3, w4, w5, w6 and w7 stored in the memory block BLK0 1262, the memory block BLK1 1264, the memory block BLK2 1266, the memory block BLK3 1268, the memory block BLK4 1270, the memory block BLK5 1272 and the memory block. BLK6 1274 of the first memory block group 1260 into the memory blocks 1282, 1283, 1284, 1286, 1288, 1290 and 1292 included the second memory block group 1280.

The workload w1 stored in the memory block BLK0 1262 of the first memory block group 1260 may be stored in the memory block BLK0 1282 of the second memory block group 1280. The workload w2 stored in the memory block BLK1 1264 of the first memory block group 1260 may be stored in the memory block BLK1 1283 of the second memory block group 1280. The workload w3 stored in the memory block BLK2 1266 of the first memory block group 1260 may be stored in the memory block BLK2 1284 of the second memory block group 1280. The workload w4 stored in the memory block BLK3 1268 of the first memory block group 1260 may be stored in the memory block BLK3 1286 of the second memory block group 1280. The workload w5 stored in the memory block BLK4 1270 of the first memory block group 1260 may be stored in the memory block BLK4 1288 of the second memory block group 1280. The workload w6 stored in the memory block BLK5 1272 of the first memory block group 1260 may be stored in the memory block BLK5 1290 of the second memory block group 1280. The workload w7 stored in the memory block BLK6 1274 of the first memory block group 1260 may be stored in the memory block BLK6 1292 of the second memory block group 1280.

When the controller 130 receives the workloads 1210, 1212, 1214, 1216, 1218, 1220 and 1222 of the transaction A 1202 on which the processing operation is completed and the workloads 1224 and 1226 of the transaction B 1204 on which the processing operation is not completed from the host 102, as described above, the controller 130 may check the information on the transaction A 1202 and the transaction B 1204 included in the workloads 1210, 1212, 1214, 1216, 1218, 1220, 1222, 1224 and 1226 received from the host 102, and then may store the workloads 1210, 1212, 1214, 1216, 1218, 1220 and 1222 of the transaction A 1202 on which the processing operation is completed in the memory blocks 1282, 1283, 1284, 1288, 1290 and 1292 included in the second memory block group 1280 of the memory device 150. Hence, as the workloads 1210, 1212, 1214, 1216, 1218, 1220 and 1222 of the transaction A 1202 on which the processing operation is completed in the host 102 are secured among the workloads 1210, 1212, 1214, 1216, 1218, 1220, 1222, 1224 and 1226 received from the host 102, management of meta data (or map information) for the workloads 1210, 1212, 1214, 1216, 1218, 1220, 1222, 1224 and 1226 received from the host 102 of the memory system 110, and usage efficiency of the memory device 150 may be improved.

Hereinafter, according to another embodiment of the present invention with reference to FIG. 13, a data processing operation when the controller 130 performs the command operation corresponding to the command received from the host 102 is described in detail. In other words, the data processing operation when the controller 130 receives workloads of transactions from the host 102 and processes the workloads with the memory device 150 is described below.

Referring to FIG. 13, the host 102 may store a plurality of transactions in a host memory 1200. For example, the plurality of transactions may include a transaction A 1202, a transaction B 1204 and a transaction C 1206. The host 102 may process the transactions A 1202, B 1204 and C 1206 stored in the host memory 1200 in units of transaction and perform a processing operation based on a user's request. Each of the transactions A 1202, B 1204 and C 1206 processed by the host 102 may include a plurality of workloads. For example, the transaction A 1202 may include a workload w1 1210, a workload w2 1212, a workload w3 1214, a workload w4 1216, a workload w5 1218, a workload w6 1220, and a workload w7 1222. The transaction B 1204 may include a plurality of workloads, including workload w8 1224, workload w9 1226, and a workload wK 1228. The transaction C 1206 may include workloads w(K+1) 1230—workload wN 1232.

The workloads w1-w7 (i.e., 1210, 1212, 1214, 1216, 1218, 1220 and 1222), w8-wk (i.e., 1224, 1226, . . . and 1228), wK+1-wN (i.e., 1230, . . . , 1232) of the transactions A 1202, B 1204 and C 1206 may include identification information indicating their transactions. In other words, the workload w1 1210, the workload w2 1212, the workload w3 1214, the workload w4 1216, the workload w5 1218, the workload w6 1220, and the workload w7 1222 may include identification information indicating the transaction A 1202. The workload w8 1224, the workload w9 1226, and the workload wK 1228 may include identification information indicating the transaction B 1204. The workload w(K+1) 1230 and the workload wN 1232 may include identification information indicating the transaction C 1206. The last workloads of the transactions A 1202, B 1204 and C 1206 may include information indicating the last workloads in their transactions. For example, the workload w7 1222 of the transaction A 1202, the workload wK 1228 of the transaction B 1204 and the workload wN 1232 of the transaction C 1206 may include completion information indicating that a processing operation of a corresponding transaction is completed through the last workload process.

The host 102 may transmit the commands for the transactions A 1202, B 1204 and C 1206, which are the workloads W1-W7 (i.e., 1210, 1212, 1214, 1216, 1218, 1220 and 1222), w8-wk (i.e., 1224, 1226, . . . and 1228), wK+1-wN (i.e., 1230, . . . 1232) of the transactions A 1202, B 1204 and C 1206 corresponding to the commands to the controller 130 based on the user's request. In other words, according to the data processing system shown in FIG. 1, the host 102 may perform the processing operation in units of transaction based on the user's request, and the memory system 110 including the controller 130 and the memory device 150 may perform the command operation processing the workloads of the transactions A 1202, B 1204 and C 1206 based on the user's request. Hence, the host 102 may transmit the workloads W1-W7 (i.e., 1210, 1212, 1214, 1216, 1218, 1220 and 1222), w8-wk (i.e. 1224, 1226, . . . and 1228), wK+1-wN (i.e., 1230 . . . , 1232) of the transactions A 1202, B 1204 and C 1206 to the controller 130 so that the memory system 110 may perform the command operation. For the sake of convenience in description, a case where the host 102 transmits the workload w1 1210, the workload w2 1212, the workload w3 1214, the workload w4 1216, the workload w5 1218, the workload w6 1220 and the workload w7 1222 of the transaction A 1202, and the workload w8 1224 and the workload w9 1226 of the transaction B 1204, which are stored in the host memory 1200, to the controller 130 is described below in detail.

When the controller 130 receives the workload w1 1210, the workload w2 1212, the workload w3 1214, the workload w4 1216, the workload w5 1218, the workload w6 1220 and the workload w7 1222 of the transaction A 1202, and the workload w8 1224 and the workload w9 1226 of the transaction B 1204 from the host 102 to perform the command operation based on the user's request, the controller 130 may store the received workloads in the buffer 1240 included in the memory 144 of the controller 130. In other words, the controller 130 may store a workload w1 1242, a workload w2 1244, a workload w3 1246, a workload w4 1248, a workload w5 1250, a workload w6 252, a workload w7 1254, a workload w8 1256 and a workload w9 1258, in the buffer 1240 included in the memory 144 of the controller 130.

The workloads 1242, 1244, 1246, 1248, 1250, 1252, 1254, 1256 and 1258 stored in the buffer 1240 of the controller 130 may include identification information indicating their corresponding transactions. In other words, the workload w1 1242, the workload w2 1244, the workload w3 1246, the workload w4 1248, the workload w5 1250, the workload w6 1252 and the workload w7 1254 may include identification information indicating the transaction A 1202, and the workload w8 1256 and a workload w9 1258 may include identification information indicating the transaction B 1204. The workload w7 1254 stored in the buffer 1240 of the controller 130 may include completion information indicating that the workload is the last workload of the transaction A 1202.

The controller 130 may check the identification information indicating the transaction A 1202 which is included in the workload w1 1242, the workload w2 1244, the workload w3 1246, the workload w4 1248, the workload w5 1250, the workload w6 1252, and the workload w7 1254. The controller 130 may also check the identification information indicating the transaction B 1204 which is included in the workload the workload w8 1256 and the workload w9 1258. Also the controller 130 may check the completion information included the workload w7 1254. The controller 130 may check that the processing operation on the transaction A 1202 is completed in the host 102, through the identification information indicating the transaction A 1202 included in the workload w1 1242, the workload w2 1244, the workload w3 1246, the workload w4 1248, the workload w5 1250, the workload w6 1252 and the workload w7 1254 and the completion information on the transaction A 1202 included in the workload w7 1254.

The controller 130 may store the workloads of the transaction A 1202 on which the processing operation is completed in the host 102 among a plurality of workloads stored in the buffer 1240 in respective memory blocks included in a first memory block group 1320 among a plurality of memory blocks included in the memory device 150 shown in FIG. 1. For example, among the workload w1 1242, the workload w2 1244, the workload w3 1246, the workload w4 1248, the workload w5 1250, the workload w6 1252, the workload w7 1254, the workload w8 1256 and the workload w9 1258 stored in the buffer 1240, the controller 130 may store the workload w1 1242, the workload w2 1244, the workload w3 1246, the workload w4 1248, the workload w5 1250, the workload w6 1252 and the workload w7 1254, in respective memory blocks included in the first memory block group 1320 among a plurality of memory blocks included in the memory device 150 shown in FIG. 1.

Particularly, the controller 130 may store the workloads stored in the buffer 1240 in the memory blocks of the memory device 150, which are distributed into a plurality of channels coupled to the memory device 150. For example, the workloads may be stored in a memory block BLK0 1322 and a memory block BLK1 1324 that are coupled to a channel ch0 1302, a memory block BLK0 1326 and a memory block BLK1 1328 that are coupled to a channel1 ch1 1304, and a memory block BLK0 1330 and a memory block BLK1 1332 that are coupled to a channel2 ch2 1306, among the memory blocks of the first memory block group 1320. According to an embodiment of the present invention, for the sake of convenience in description, it is described in detail below as an example that the workload w1 1242 is stored in the memory block BLK0 1322 coupled to the channel0 1302, and the workload w2 1244 is stored in the memory block BLK1 1324 coupled to the channel0 1302. The workload w3 1246 is stored in the memory block BLK0 1326 coupled to the channel1 1304, and the workload w4 1248 is stored in the memory block BLK1 1328 coupled to the channel1 1304. The workload w5 1250 is stored in the memory block BLK0 1330 coupled to the channel2 1306, and the workload w6 1252 is stored in the memory block BLK1 1332 coupled to the channel2 1306. The workload w7 1254 is stored in the memory block BLK0 1334 coupled to the channel3 1308.

As described above, the controller 130 may store the workloads 1242, 1244, 1246, 1248, 1250, 1252 and 1254 of the transaction A 1202 on which the processing operation is completed in the host 102 among the workloads 1242, 1244, 1246, 1248, 1250, 1252, 1254, 1256 and 1258 stored in the buffer 1240, in the memory blocks 1322, 1324, 1326, 1328, 1330, 1332 and 1334 coupled to the channels 1302, 1304, 1306 and 1308 of the first memory block group 1320 among the memory blocks included in the memory device 150 shown in FIG. 1, respectively.

The first memory block group 1320 among the memory blocks of the memory device 150 may include single-level cell (SLC) memory blocks or multi-level cell (MLC) memory blocks, and a second memory block group 1350 may include multi-level cell memory blocks, for example, triple-level cell (TLC) memory blocks. Hereinafter, for the sake of convenience in description, it is described in detail as an example that the first memory block group 1320 includes the single-level cell memory blocks, and the second memory block group 1350 includes the multi-level cell memory blocks or the triple-level cell memory blocks. According to an embodiment of the present invention, as described above, when the first memory block group 1320 includes the single-level cell memory blocks, the single-level cell memory blocks in the first memory block group 1320 may be used as buffers.

In other words, the controller 130 may use the memory blocks 1322, 1324, 1326, 1328, 1330, 1332 and 1334 of the first memory block 1320 including the single-level cell memory blocks as the buffers. The controller 130 may check the identification information and the completion information on the transaction included in each of the workloads w1, w2, w3, w4, w5, w6 and w7 stored in the memory blocks 1322, 1324, 1326, 1328, 1330, 1332 and 1334 of the first memory block group 1320, and may check the workloads where the processing operations on the transactions are completed in the host 102. In other words, the controller 130 may check that the processing operation on the transaction A 1202 is completed in the host 102 through the identification information indicating the transaction A 1202 included in the workload w1 1242, the workload w2 1244, the workload w3 1246, the workload w4 1248, the workload w5 1250, the workload w6 1252 and the workload w7 1254 that are stored in the buffer 1240 and the completion information on the transaction A 1202 included in the workload w7 1254.

In addition, the controller 130 may transmit and store the workloads w1, w2, w3, w4, w5, w6 and w7 stored in the memory blocks 1322, 1324, 1326, 1328, 1330, 1332 and 1334 of the first memory block group 1320 into memory blocks 1352, 1354, 1356, 1358, 1360, 1362 and 1364 coupled to the same channel in the second memory block group 1350, respectively.

The workload w1 stored in the memory block BLK0 1322 coupled to the channel0 1302 of the first memory block group 1320 may be stored in the memory block0 BLK0 1352 coupled to the channel0 1302 of the second memory block group 1350. The workload w2 stored in the memory block BLK1 1324 coupled to the channel0 1302 of the first memory block group 1320 may be stored in the memory block BLK1 1354 coupled to the channel0 1302 of the second memory block group 1350. The workload 3 stored in the memory block BLK0 1326 coupled to the channel1 1304 of the first memory block group 1320 may be stored in the memory block BLK0 1356 coupled to the channel1 1304 of the second memory block group 1350. The workload w4 stored in the memory block BLK1 1328 coupled to the channel1 1304 of the first memory block group 1320 may be stored in the memory block BLK1 1358 coupled to the channel1 1304 of the second memory block group 1350. The workload w5 stored in the memory block BLK0 1330 coupled to the channel2 1306 of the first memory block group 1320 may be stored in the memory block BLK0 1360 coupled to the channel2 1306 of the second memory block group 1350. The workload w6 stored in the memory block BLK1 1332 coupled to the channel2 1306 of the first memory block group 1320 may be stored in the memory block BLK1 1362 coupled to the channel2 1306 of the second memory block group 1350. The workload w7 stored in the memory block BLK0 1334 coupled to the channel3 1308 of the first memory block group 1320 may be stored in the memory block BLK0 1364 coupled to the channel3 1308 of the second memory block group 1350.

When the controller 130 receives the workloads 1210, 1212, 1214, 1216, 1218, 1220 and 1222 of the transaction A 1202 on which the processing operation is completed and the workloads 1224 and 1226 of the transaction B 1204 on which the processing operation is not completed from the host 102, as described above, the controller 130 may check the information (i.e., the identification information and the completion information) on the transaction A 1202 and the transaction B 1204 included in the workloads 1210, 1212, 1214, 1216, 1218, 1220, 1222, 1224 and 1226 received from the host 102. Then, the controller 130 may store the workloads 1210, 1212, 1214, 1216, 1218, 1220 and 1222 of the transaction A 1202 on which the processing operation is completed, in the memory blocks 1352, 1354, 1356, 1358, 1360, 1362 and 1364 coupled to the channels 1302, 1304, 1306 and 1308 of the second memory block group 1350 of the memory device 150. Hence, as the workloads 1210, 1212, 1214, 1216, 1218, 1220 and 1222 of the transaction A 1202 on which the processing operation is completed in the host 102 are secured among the workloads 1210, 1212, 1214, 1216, 1218, 1220, 1222, 1224 and 1226 received from the host 102, management of meta data (or map information) for the workloads 1210, 1212, 1214, 1216, 1218, 1220, 1222, 1224 and 1226 received from the host 102 of the memory system 110, and usage efficiency of the memory device 150 may be improved. Furthermore, as the workloads 1210, 1212, 1214, 1216, 1218, 1220 and 1222 of the transaction A 1202 on which the processing operation is completed in the host 102 are stored in the distributed memory blocks coupled to the channels 1302, 1304, 1306 and 1308, the workloads may be rapidly processed in the memory system 110, thereby improving performance of the memory system 110. Then a data processing operation where the workloads are processed in the memory device 150 of the memory system according to an embodiment of the present invention is described in detail below with reference to FIG. 14.

Figure 14:
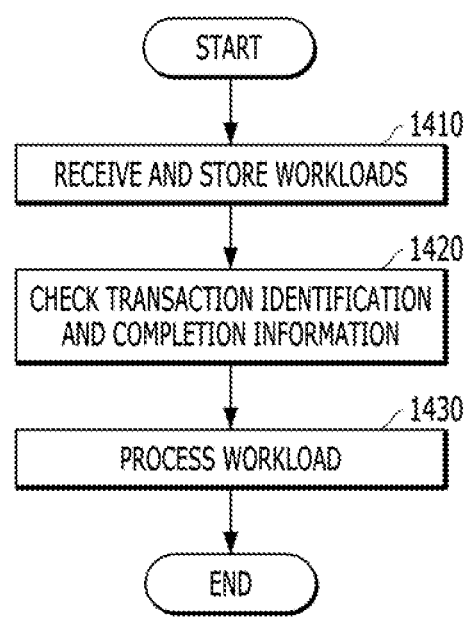
FIG. 14 is a flowchart illustrating a data processing operation of a memory system, according to an embodiment of the present invention.

FIG. 14 is a flowchart illustrating a data processing operation of a memory system, according to an embodiment of the present invention. For example, the operation may be performed by the memory system 110 including the controller 130 and the memory device 150 as shown in FIGS. 1, 12 and 13.

Referring to FIG. 14, in step S1410, the memory system 110 may receive a plurality of workloads for transactions processed in units of transaction from the host 102. The controller 130 may store the received workloads in the memory 144 included in the controller 130.

In step S1420, the controller 130 may check identification information indicating a transaction for each of the workloads, and completion information indicating the last workload of each transaction, included in the workloads stored in the memory 144. The controller 130 may check the workloads where the processing operation on the transaction is completed in the host 102 among the workloads stored in the memory 144.

In step S1430, the controller 130 may process the workloads stored in the memory 144. Particularly, the workloads where the processing operation on the transaction is completed in the host 102 among the workloads stored in the memory 144 may be stored in the memory device 150 based on the identification information and the completion information included in the workloads. The workloads where the processing operation on the transaction is completed in the host 102 may be transmitted and stored into the second memory block groups of the memory device 150.

When the workloads received from the host are processed, the workloads may be stored in the memory blocks of the memory device, particularly, the second memory block group of the memory device after the identification information and the completion information on the transactions included in the workloads are checked. Since detailed descriptions thereof are described above with reference to FIGS. 12 and 13, repetition is avoided.

According to embodiments of the present invention, a memory system may more rapidly and stably process data inputted to a memory device by minimizing complexity and performance degradation of the memory system and maximizing memory device usage efficiency.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the spirit and/or scope of the present invention as defined by the following claims.

What is claimed is:

1. A memory system, comprising:
   a memory device including a first and a second group of memory blocks; and
   a controller suitable for performing a processing operation corresponding to a plurality of workloads included in transactions received from a host,
   wherein each workload includes identification information indicating its corresponding transaction, and the last workload of each transaction includes completion information indicating the last one of its corresponding transaction, and
   wherein the controller is suitable for:
      checking the transaction identification information and the completion information included in the workloads,
      storing first workloads among the workloads in the memory blocks included in the first group, corresponding to the identification information and the completion information,
      determining which transaction is completed based on the first workloads, and
      when at least one transaction is completed, transmitting and storing some of the first workloads, corresponding to completed transaction, into the memory blocks included in the second group.

2. The memory system of claim 1, wherein the first workloads are included in a first transaction on which the processing operation is completed in the host.

3. The memory system of claim 2, wherein each of the first workloads includes the identification information indicating the first transaction.

4. The memory system of claim 2, wherein the last workload among the first workloads includes the completion information indicating that the processing operation on the first transaction is completed in the host.

5. The memory system of claim 1, wherein the controller stores the workloads in the memory blocks of the first group, and then transmits and stores the first workloads among the workloads stored in the memory blocks of the first group into the memory blocks of the second group.

6. The memory system of claim 1, wherein the controller distributes and stores the first workloads into first memory blocks of the first group, which are coupled to each of multiple channels, and then transmits and stores the first workloads into second memory blocks of the second group, which are coupled to each of the same channels as the first memory blocks.

7. The memory system of claim 1, wherein the memory blocks of the first group include single-level cell memory blocks, and the memory blocks of the second group include triple-level cell memory blocks.

8. The memory system of claim 1, wherein the transactions are processed in units of transaction in the host, and the workloads of the transactions on which the processing operation is completed in the host and the workloads of the transactions in process are transmitted to the controller.

9. A method for operating a memory system, comprising:
receiving transactions including workloads from a host for a plurality of memory blocks of a memory device, the plurality of memory blocks including a first group and a second group;
checking identification information and completion information on the transactions from the workloads, wherein each workload includes identification information indicating its corresponding transaction, and the last workload of each transaction includes completion information indicating the last one of its corresponding transaction;
storing first workloads among the workloads in the memory blocks included in the first group, corresponding to the identification information and the completion information;
determining which transaction is completed based on the first workloads; and
when at least one transaction is completed, transmitting and storing some of the first workloads, corresponding to completed transaction, into the memory blocks included in the second group.

10. The method of claim 9, wherein the first workloads are included in a first transaction on which a processing operation is completed in the host among the transactions.

11. The method of claim 10, wherein each of the first workloads includes the identification information indicating the first transaction.

12. The method of claim 10, wherein the last workload among the first workloads includes the completion information indicating that the processing operation on the first transaction is completed in the host.

13. The method of claim 9, wherein the workloads are stored in the memory blocks of the first group, and then the first workloads among the workloads stored in the memory blocks of the first group are transmitted and stored into the memory blocks of the second group.

14. The method of claim 9, wherein the first workloads are distributed and stored into first memory blocks of the first group, which are coupled to each of multiple channels, and then the first workloads are transmitted and stored into second memory blocks of the second group, which are coupled to each of the same channels as the first memory blocks.

15. The method of claim 9, wherein the memory blocks of the first group include single-level cell memory blocks, and the memory blocks of the second group include triple-level cell memory blocks.

16. The method of claim 9, wherein the transactions are processed in units of transaction in the host, and the workloads of the transactions on which the processing operation is completed in the host and the workloads of the transactions in process are transmitted to a controller of the memory device.

* * * * *